(12) United States Patent
Frazier et al.

(10) Patent No.: US 9,990,617 B2
(45) Date of Patent: Jun. 5, 2018

(54) CONSUMER OPT-IN TO INFORMATION SHARING AT POINT OF SALE

(71) Applicant: SONY CORPORATION, Tokyo (JP)

(72) Inventors: Milton Massey Frazier, San Marcos, CA (US); Tim Smith, Carlsbad, CA (US)

(73) Assignee: SONY CORPORATION, Tokyo (JP)

( * ) Notice: Subject to any disclaimer, the term of this patent is extended or adjusted under 35 U.S.C. 154(b) by 1338 days.

(21) Appl. No.: 13/868,355

(22) Filed: Apr. 23, 2013

(65) Prior Publication Data

US 2013/0238452 A1    Sep. 12, 2013

Related U.S. Application Data

(63) Continuation-in-part of application No. 11/809,141, filed on May 30, 2007.

(60) Provisional application No. 60/897,687, filed on Jan. 26, 2007, provisional application No. 60/897,715, filed on Jan. 25, 2007.

(51) Int. Cl.
G06Q 10/00 (2012.01)
G06Q 20/20 (2012.01)
G06Q 30/02 (2012.01)

(52) U.S. Cl.
CPC ....... *G06Q 20/202* (2013.01); *G06Q 30/0203* (2013.01); *G06Q 30/0255* (2013.01)

(58) Field of Classification Search
CPC ...... G06Q 20/202; G06Q 20/20; G06Q 20/40; G06Q 20/02; G06Q 30/0255; G06Q 30/0207; G06Q 30/0268
See application file for complete search history.

(56) References Cited

U.S. PATENT DOCUMENTS

| | | | | |
|---|---|---|---|---|
| 5,826,241 A | * | 10/1998 | Stein | G06Q 10/00 705/26.41 |
| 6,112,181 A | * | 8/2000 | Shear | G06F 21/10 705/7.29 |
| 6,270,011 B1 | * | 8/2001 | Gottfried | G06F 21/32 235/379 |
| 6,601,040 B1 | * | 7/2003 | Kolls | G07F 5/18 705/14.23 |
| 7,234,065 B2 | * | 6/2007 | Breslin | G06Q 10/10 713/165 |
| 7,344,069 B1 | * | 3/2008 | Morimoto | G06Q 20/20 235/383 |
| 7,596,513 B2 | * | 9/2009 | Fargo | G06Q 30/00 705/26.62 |
| 7,873,534 B2 | * | 1/2011 | Simons | G06Q 30/02 705/7.29 |

(Continued)

OTHER PUBLICATIONS

Juels, Ari, and John Brainard. "Soft blocking: flexible blocker tags on the cheap." Proceedings of the 2004 ACM workshop on Privacy in the electronic society—WPES 04, Oct. 28, 2004, pp. 1-7. (Year: 2004).*

*Primary Examiner* — William S Brockington, III
(74) *Attorney, Agent, or Firm* — John L. Rogitz (57) ABSTRACT

Concurrent first and second uses of a consumer's credit card are made during a POS transaction to effect information sharing. The first use includes conventionally executing a primary transaction, while the second use includes a presentation to the consumer at POS with information sharing opt-in and/or privacy notices from the consumer's financial institution.

19 Claims, 4 Drawing Sheets

(56) References Cited

U.S. PATENT DOCUMENTS

| | | | | |
|---|---|---|---|---|
| 8,301,493 B2* | 10/2012 | Sanders | ............... | G06Q 30/02 |
| | | | | 705/14.1 |
| 8,489,511 B2* | 7/2013 | Coleman | ............ | G06F 21/6254 |
| | | | | 705/51 |
| 8,939,357 B1* | 1/2015 | Perry | ................ | G06Q 20/387 |
| | | | | 235/379 |
| 2001/0032115 A1* | 10/2001 | Goldstein | ............ | G06Q 30/02 |
| | | | | 705/7.32 |
| 2001/0042022 A1* | 11/2001 | Kirkpatrick | ........ | G06Q 30/012 |
| | | | | 705/302 |
| 2002/0065716 A1* | 5/2002 | Kuschill | ............. | G06Q 30/02 |
| | | | | 705/14.25 |
| 2002/0198791 A1* | 12/2002 | Perkowski | ....... | G06F 17/30879 |
| | | | | 705/14.41 |
| 2004/0139025 A1* | 7/2004 | Coleman | ............ | G06F 21/6254 |
| | | | | 705/51 |
| 2006/0085443 A1* | 4/2006 | Pae | ................... | G06F 21/6227 |
| 2007/0192121 A1* | 8/2007 | Routson | ............. | G06Q 50/265 |
| | | | | 705/1.1 |
| 2009/0006151 A1* | 1/2009 | Zarghami | ......... | G06Q 10/06375 |
| | | | | 705/7.31 |
| 2010/0312649 A1* | 12/2010 | Lurie | ................... | G06Q 30/02 |
| | | | | 705/14.66 |
| 2011/0055019 A1* | 3/2011 | Coleman | ............ | G06F 21/6254 |
| | | | | 705/14.66 |
| 2011/0055030 A1* | 3/2011 | Nicolas | ................ | G06Q 20/20 |
| | | | | 705/16 |
| 2011/0258117 A1* | 10/2011 | Ahmad | ............... | G06Q 20/202 |
| | | | | 705/44 |
| 2012/0197800 A1* | 8/2012 | Ross | ..................... | G06Q 20/10 |
| | | | | 705/44 |
| 2012/0239479 A1* | 9/2012 | Amaro | ................ | G06Q 20/102 |
| | | | | 705/14.23 |
| 2013/0159085 A1* | 6/2013 | Mankoff | ............ | G06Q 30/0226 |
| | | | | 705/14.27 |
| 2013/0238452 A1* | 9/2013 | Frazier | ............... | G06Q 30/0203 |
| | | | | 705/17 |
| 2013/0297379 A1* | 11/2013 | Coleman | ............ | G06F 21/6254 |
| | | | | 705/7.29 |

* cited by examiner

CONSUMER OPT-IN TO INFORMATION SHARING AT POINT OF SALE

This is a continuation-in-part of U.S. patent application Ser. No. 11/809,141, filed May 30, 2007, which claims priority from U.S. provisional application 60/897,715, filed Jan. 25, 2007, from both of which is priority claimed and both of which are incorporated by reference herein.

FIELD OF THE INVENTION

The present invention relates generally to systems and methods for gaining consumer opt-in at point of sale to information sharing.

BACKGROUND OF THE INVENTION

The above-identified parent patent application provides a computerized system and method to leverage a point-of-sale transaction to beneficially share consumer information with entities other than the merchant and consumer. As recognized herein, it is desirable to obtain consumer consent for such information sharing and to do so in a fast, convenient way that is not cumbersome for the consumer or the merchant. As further recognized herein, many consumers might prefer that privacy concerns related to information sharing are addressed and protected by their financial institution as opposed to the point of sale merchant. The present invention further understands, however, that a financial institution such as a credit card issuer bank typically has its own unique privacy policy, and that this can present challenges in exchanging privacy notices between bank and consumer at point of sale in real time.

SUMMARY OF THE INVENTION

An apparatus includes a point of sale (POS) credit card reader and a POS processor receiving credit card data from the reader and sending the data in a primary transaction message to a financial institution computer system to undertake transaction processing. The POS processor also sends the credit card data to at least one financial institution computer system in a secondary message and based on a response, causes an information sharing opt-in notice from the financial institution computer system and/or a privacy notice from the financial institution computer system, and preferably both, to be presented to a consumer at the POS.

In some implementations the POS processor transmits a query to a pool of candidate financial institution computers to determine which financial institution represented in the pool is the institution that issued the credit card. If the POS processor receives a positive response from one of the candidate financial institution computers in the pool an opt-in offer is presented to the consumer. The POS processor then sends a consumer response to the offer to the financial institution computer, and in response to a positive consumer response the POS processor receives back from the financial institution computer the opt-in notice and the privacy notice.

In another aspect, an apparatus includes at least one financial institution computer system communicating with a point of sale (POS) computer to execute a primary transaction. The financial institution computer system also communicates with the POS computer to execute a consumer opt-in transaction concurrently with the primary transaction.

In yet another aspect, a method includes making concurrent first and second uses of a consumer's credit card during a POS transaction to effect information sharing. The first use includes executing a primary transaction and the second use includes a presentation to the consumer at POS with opt-in and/or privacy notices from the consumer's financial institution.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
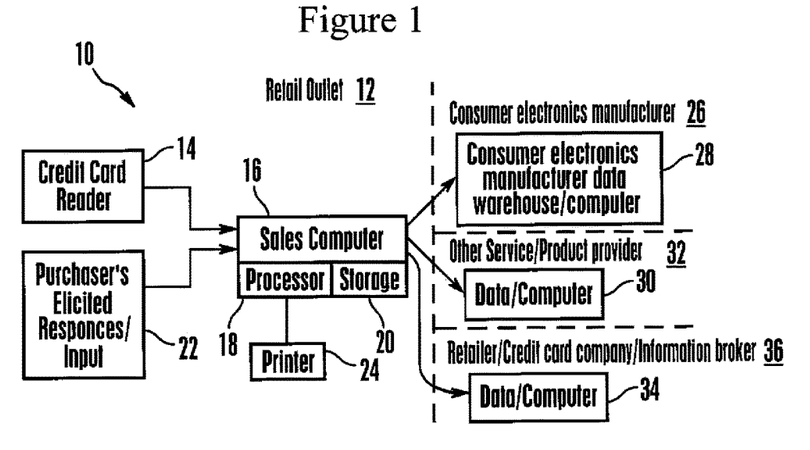
FIG. 1 is a block diagram of a non-limiting system in accordance with present principles.

Referring initially to FIG. 1, a system is shown, generally designated 10, which includes one or more sources such as online or brick and mortar retail outlets 12 (only one shown for clarity) that sell products, and in particular consumer electronics (CE). Accordingly, within each retail outlet 12 are plural credit readers 14 or other consumer input devices (only one shown) for reading credit card information from credit cards that are swiped through the readers 14 (or placed close enough to exchange data using near field communications) and for sending the credit card information to one or more sales computers 16, each of which typically includes a display 16a (which may be a touch screen display), a processor 18, and local or remote disk-based and/or solid state data storage 20 for holding data and logic. The touch screen display 16a or other similar display may be associated with the credit card reader 14 so that a consumer can view information and respond to opt-in queries by manipulating the touch screen.

Along with the credit card information, product information including product type, possibly product serial number, and so on is also entered into the sales computer 16 and correlated to a sales date when a store clerk enters this information, typically by scanning a bar code or other unique identification of the CE product.

In accordance with principles set forth further below, in addition to the above information the sales computer 16 can also receive information from the elicited responses 22 of a purchaser that may be input by any appropriate means, including scanning, keyboard entry, etc. As discussed below, this additional information is optional, i.e., it typically may be within the consumer's discretion to provide it or not. Sales receipts, warranty information, and various additional information in accordance with disclosure below may be printed out on a printer 24 or otherwise provided to the purchaser.

In accordance with the various use cases discussed below, the system 10 may also include a CE manufacturer site 26 with CE manufacturer computer system 28 and associated data warehouse that receives information from the retail outlet 12. In some implementations the retail outlet 12 may have a contractual relationship with the CE manufacturer 26 and/or be a "branded partner" of the CE manufacturer 26.

Also receiving information from the retail outlet 12 may be a service provider computer 30 at a service/product provider site 32, it being understood that the service/product provider is not the same as the CE manufacturer. The retail outlet 12 may further send information to a computer system 34 of another retailer or credit card company or information broker 36.

Figure 2:
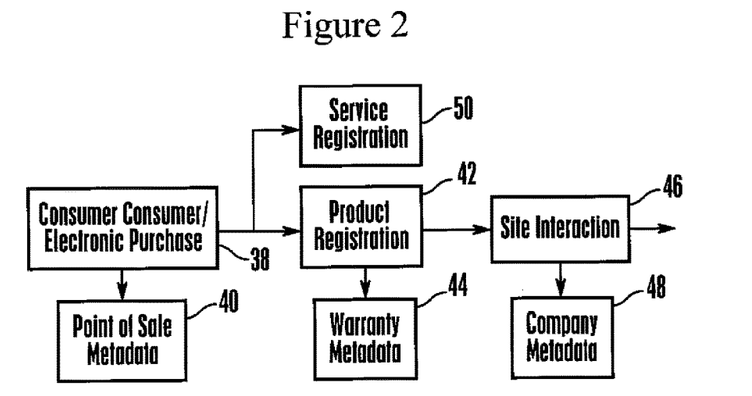
FIG. 2 is a flow chart illustrating non-limiting data gathering steps in accordance with the present invention to support the various use cases described herein.

FIG. 2 illustrates how consumer data may be collected and used in various exemplary non-limiting use cases. At block 38 a consumer makes a CE purchase at the retail outlet 12 using, e.g., the consumer's credit card. The CE may be, without limitation, a digital camera, wireless phone, TV, computer, etc. In any case, at block 40 certain point of sale (POS) metadata is collected by the sales computer 16 including the consumer's credit card number, the type and number of CE purchased, the date of purchase, etc. The database may be internal to the POS, external to the POS, and owned by any of the entities described herein.

At the time of sale, the consumer advantageously may be offered, orally or in writing on, e.g., a monitor, to register the CE just purchased, and the consumer may elect to do so at block 42, generating what might be termed "warranty metadata". As part of the process, the consumer is asked for the additional warranty metadata, which can include a current home address, a mailing address if different than the home address, a zip code, a telephone number, an email address, etc. As an incentive to provide the additional information, the CE manufacturer may offer, through the retail outlet 12, product discount coupons to the consumer, or service offers, or a discount on the current sale, or simplified cross-registration, etc.

Figure 4:
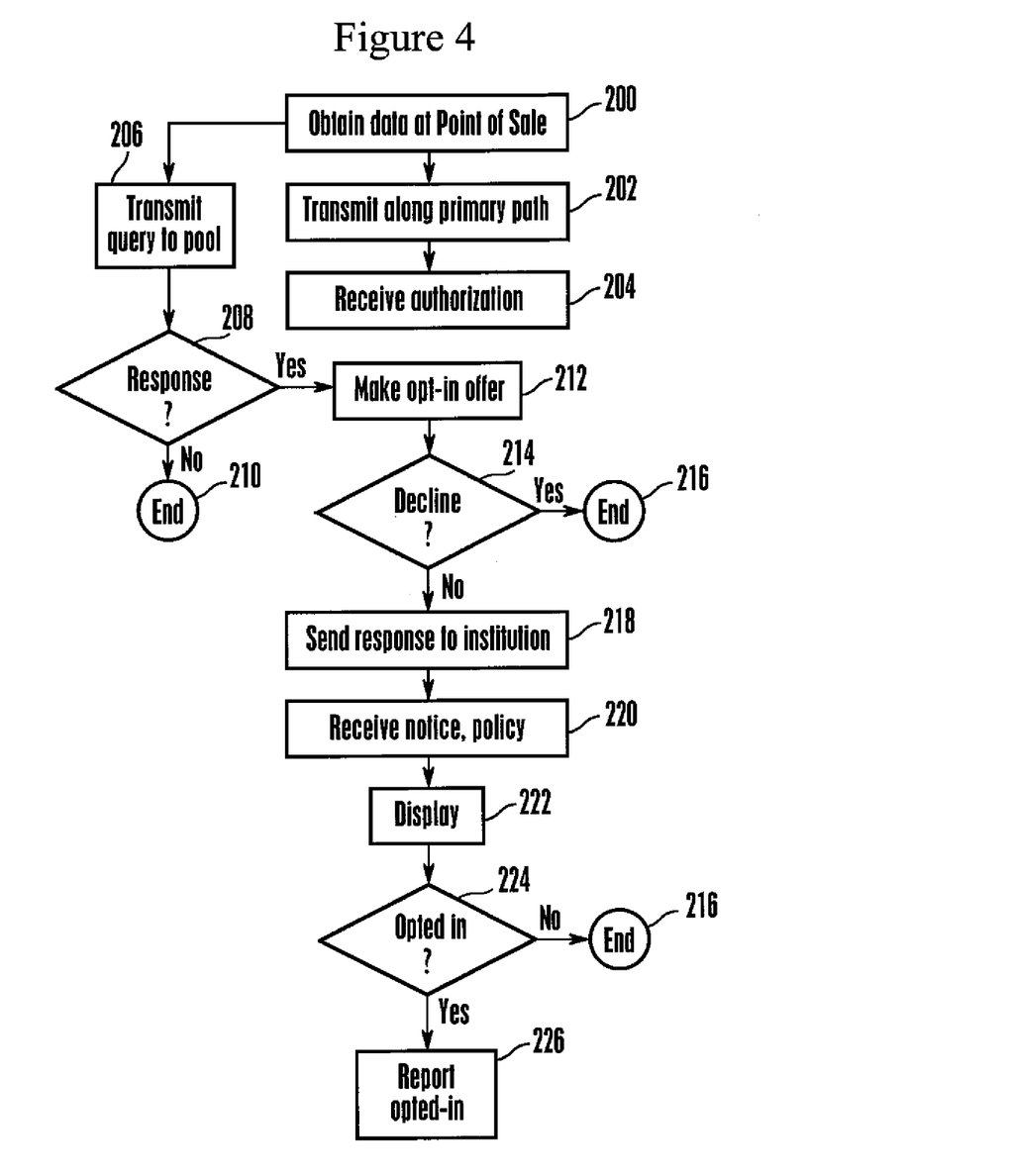
FIG. 4 is a flow chart of non-limiting opt-in logic executed at the point of sale computer.
Figure 5:
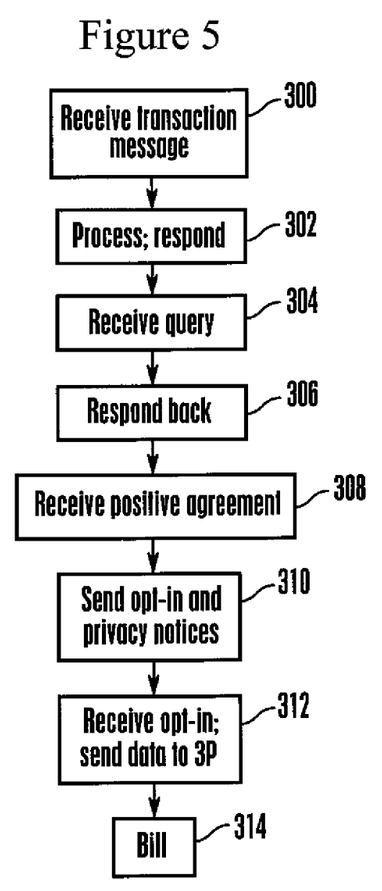
FIG. 5 is a flow chart of non-limiting opt-in logic executed at the financial institution computer.

It is to be understood that FIGS. 4 and 5 show a non-limiting logic by which a consumer may opt in to the activities in the above paragraph.

Accordingly, with the above-discussed information a CE manufacturer use case can now be explicated. The information above is provided to the CE manufacturer 26 (by, e.g., sending the information over the Internet from the sales computer 16 to the CE computer system 28. The information is used as marketing information to improve products and product mix. As an example, if the information indicates that consumers are buying many camera-enabled wireless phones with short-range radiofrequency communication capability (e.g., so-called "Bluetooth" capability), and secondary service information gathered by the CE manufacturer reveals problems transferring images from cell phones to TVs for display of the images, the CE manufacturer is given early warning of a consumer demand for Bluetooth-enabled TVs.

In addition, because the warranty information at block 44 can indicate consumer contact information that may represent updated information from that which may have been earlier gathered by the CE manufacturer, the manufacturer realizes increased marketing savings and sales. This can be manifested when, for instance, the CE manufacturer uses the updated contact information to provide written or electronic advertising materials to the consumer either directly or through a third party aggregator, made possible by the correlation of data from the consumer, the purchased CE, and the retail outlet 12 at which the CE was purchased. For example, by correlating the consumer contact information with the knowledge of where and what CE the consumer bought, the CE manufacturer can send to the consumer coupons or other promotional material that might offer discounts or other purchasing incentive for CEs that can be bought in the future at the retail outlet 12 specifically.

In addition to the above information that may be gathered at the retail outlet 12 at the time of sale, at block 46 the consumer may be offered website registrations related to the purchased CE for various service providers having Internet-related businesses and services. As but one example, the purchaser of a digital camera might be offered registration on the website of a community photograph-sharing site such as "YouTube". Or, the offered web site registration may be for a photograph printing website. In the case of a purchased wireless device, the website registration offering may be for a telephony carrier. If the consumer agrees to such registration, the consumer provides additional information at block 48 that might be thought of as "company metadata" since it includes registration information of the consumer as it relates to the selected registration service provider 32. The information at block 48 can include preferences for other services/products, additional consumer demographic data, etc.

With this above explanation in mind, a service/product provider 32 use case may now be better understood. Assume for illustration that a website owner who desires relevant customers enters a contractual agreement with the retail outlet 12 to offer the above-described website registration at block 46 for relevant device(s) a consumer purchases. In exchange, the website owner pays to the retail outlet 12 a certain dollar value or reclamation for every "N" of consumers who register for the website at block 46. For the consumer's part, the consumer can be offered the contracting website or service as a first option but may opt for a secondary provider. To incentivize the consumer to select the first option, the consumer may be offered, at the point of sale, a discount on the purchased item and/or on the first option service if the consumer selects the first option.

Additionally or alternatively to the above, the website owner might agree to advertise the CE on its website. An advertisement may be presented for every new site registrant for a particular CE device. Still further, the website owner, or retail outlet, may also give information back to the CE manufacturer if the web site gathers information indicating a change of the registrant's name or email address or physical (billing) address, etc., recognizing that the CE purchased at block 38 may have been purchased as a gift and thus facilitating increased metadata relating the purchased CE device.

Still further, the website owner may also insert advertisements from the CE manufacturer for every consumer that bought the CE device, assuming the device was registered with the website at block 46, charging the CE manufacturer 26 for the insertion. In some implementations the website owner may also provide information back to the CE manufacturer related to updated consumer information such as click through on advertisement, and other related data (behavioral metadata, analytical metadata, contextual metadata, and demographic metadata). Related third party information, such as advertisements relating to new discounted credit cards, changes in consumer information, etc., may also be provided to the consumer and to a related third party (e.g., to a credit card company) based on metadata from the website (e.g., click throughs by the same consumer on related or unrelated advertisements, etc.)

Concluding the description of FIG. 2, block 50 indicates that as part of the point of sale activity the consumer may also be offered a secondary service such as CE device maintenance or network provision service. For example, if the consumer buys a computer the consumer may be offered to register with a computer repair service provider.

A retailer/credit card company/consumer information buyer/seller/broker 36 use case can now be understood. Since the entity 36 desires consumer information for a variety of reasons, the entity 36 can contract with the CE manufacturer to provide non-personally identifiable information on potential customers. Metadata information is gathered as described above (e.g., change of address, change of email address, change in contact phone number, etc.) and provided, for a fee, to the entity 36. Targeted advertising from the entity 36 can then be provided to the consumer based on this metadata to thereby provide improved correlation of the consumer with needed products or services. The CE manufacturer also obtains value from the updated contact information.

Figure 3:
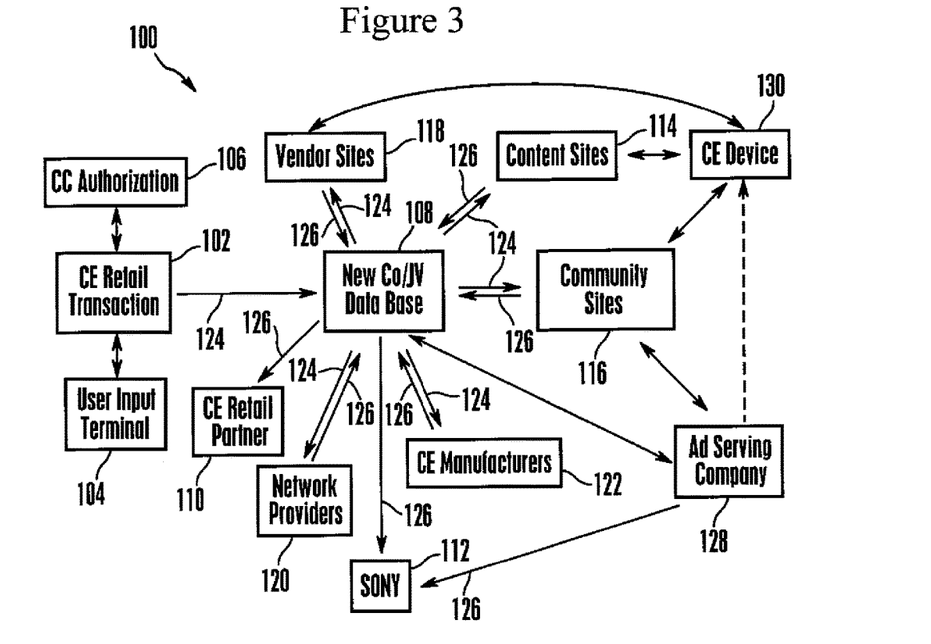
FIG. 3 is a block diagram of another non-limiting system in accordance with present principles.

FIG. 3 illustrates a system 100 that embodies above principles. A consumer electronics (CE) retail transaction computer 102 may receive input from a user input terminal 104 for executing a retail transaction that can include authorizing a credit card (CC) transaction from a remotely-located CC authorization computer 106. The transaction information, including type and serial number/model number of the CE that is purchased, CC data, and if desired the above-mentioned registration data can be sent to a database 108 that potentially may be a joint venture database between, e.g., a CE retail partner 110 such as a CE retail outlet and a principal CE manufacturer 112 such as Sony Corp. The registration information in the database 108 may be accessed by various entities for a fee. For example, content websites 114, community websites 116, vendor websites 118, network providers (such as telephone service providers) 120, and other CE manufacturers 122 may access the database 108 to receive registration information, indicated by arrows 124, in exchange for fees, indicated by arrows 126. As shown in FIG. 3, the CE retail partner 110 and principal CE manufacturer 112 may also receive fees 126 for the provision of registration information 124.

If desired, an ad serving company computer 128 may communicate with the database 108, principal CE manufacturer 112, and community websites 116 to receive registration information to better tailor advertising to purchasers. A purchased and registered CE device 130 may receive advertising wirelessly or via wired networking from the ad computer 130, and may communicate with the content websites 114 and community websites 116 as shown in accordance with principles known in the art.

FIG. 4 illustrates logic that the point of sale computer 16/102 can execute to provide for consumer opt-in to the above-described information sharing activities while FIG. 5 illustrates the opt-in logic that may be employed by the credit card company computer 34/CC authorization computer 106. Commencing at block 200, the consumer's data is obtained at the point of sale (POS), typically by swiping a credit card through the card reader shown in FIG. 1 pursuant to a POS transaction for goods or services or by receiving the credit card number over the Internet for an online purchase. The data is transmitted at block 202 to the authorization computer 34/106 along a primary transaction path, typically the communication path normally used for credit card authorizations between the POS and the authorization computer 34/106. At block 204, the POS computer receives back authorization and processes the transaction.

Concurrently with this conventional primary transaction processing, at block 206 the POS computer transmits a query to a pool of candidate financial institution computers to determine which financial institution represented in the pool is the institution that issued the credit card swiped at block 200 and whether the associated consumer is eligible for the opt-in offer described below. This query is not sent along the conventional primary transaction, which typically is configured for a limited number of communication message types pursuant to credit or debit card authorization, but rather is sent along a secondary path or message or mode.

If no response is received at the POS at decision diamond 208 within a predetermined period, e.g., thirty or sixty seconds, or a negative response is received, the process ends at state 210. However, if the POS computer receives a positive response from one of the candidate financial institution computers in the pool (which may be the authorization computer processing the primary transaction) the logic moves to block 212 to make an opt-in offer to the consumer, either by displaying it on the display discussed above or by prompting, using the POS computer, a sales clerk to make a verbal offer. The opt-in offer typically is an offer for discounts or other consideration in exchange for agreeing to share information, possibly pursuant to a registration, as disclosed herein.

The consumer can respond orally to a verbal offer or if desired can operate the above-discussed touchscreen display to select a "yes" or "no" indicator. If decision diamond 214 indicates that the consumer declines, the logic ends at state 216, but a positive response causes the POS computer to send a positive report at block 218 to the financial institution computer. In response, at block 220 the POS computer receives back from the financial institution computer an opt-in notice and a privacy policy statement that typically is unique to the consumer's financial institution.

As a non-limiting example, an opt-in notice might be: "by agreeing to let us share your information with selected third parties and/or to provide registration information for the appended purposes, you will receive a 10% discount on your next purchase". A non-limiting example privacy statement might be: "we will share only your name and street address to select third parties we have screened based on your purchasing preferences. No other information will be shared."

These messages are displayed to the consumer at state 222 using one of the displays described above, and it is determined at decision diamond 224 whether the consumer has opted in as indicated by consumer or store clerk input. If the consumer declines, the process ends at state 216, but otherwise the POS computer transmits a message to the financial institution computer at block 226, reporting the opt-in. The communications between POS computer and financial institution computer from blocks 206 on are on the secondary mode.

FIG. 5 illustrates complementary logic undertaken by the financial institution computer(s). The primary transaction message from the POS is received at block 300 and processed and responded to at block 302. Subsequent blocks illustrate processing of messages along the above-discussed secondary mode/path/message.

At block 304, the above-discussed query from the POS for eligibility along with the credit card information is received. When the institution computer recognizes the credit card data as being one of its own, it sends a response back to the POS at block 306 indicating whether the consumer is eligible for the opt-in program. Should a positive agreement be received from the consumer via the POS at block 308, the opt-in and privacy notices are sent to the POS for consumer access at block 310. If a signal from the POS is received at block 312 indicating consumer opt-in, selected consumer data is sent to third party databases at block 312 in accordance with the opt-in and privacy notices. Billing between entities for the sharing of data is undertaken at block 314 in accordance with principles above.

It may now be appreciated that inventively, dual, simultaneous use is made of a consumer's credit card during a POS transaction to effect information sharing. Furthermore, instead of forcing a one-size-fits-all opt-in and privacy policy of a PUS onto all consumers, each consumer is presented with opt-in and/or privacy notices from the consumer's financial institution. Contact information is automatically collected via the consumer's financial institution, and determination of information sharing program eligibility is made automatically by the consumer's financial institution while the consumer waits for a few seconds at the POS. The POS is thus advantageously leveraged for automatic data collection and information sharing.

While the particular CONSUMER OPT-IN TO INFORMATION SHARING AT POINT OF SALE is herein shown and described in detail, it is to be understood that the subject matter which is encompassed by the present invention is limited only by the claims. For example, for the function at block 200 a debit card could be used, or a mobile device with near field communication capability, a token, a proximity card, an identification card, etc. The financial institution could be a bank, a member club, a loyalty program, a membership association, or a non-profit organization. The primary transaction process could be, in addition to a credit authorization process, a membership renewal, an account generation, a loyalty transaction, an account retrieval, a historical transaction review, etc. The consumer information reported at block 226 could be consumer name, address, phone number, email address, IP address, IMEI address, serial numbers, SKU numbers, RFID numbers, transaction reference numbers, member ID numbers, etc. The POS transaction can be, in addition to on-site retail and online transactions, mobile transactional processing, vending machine transactions, telemarketing transactions.

What is claimed is:

1. A system comprising:
   at least one financial institution computer;
   plural candidate financial institution computers;
   at least one point of sale (POS) credit card reader;
   a credit card authorization path;
   a secondary communication path different from the credit card authorization path; and
   at least one POS computer comprising at least one processor communicatively coupled to the POS credit card reader for receiving credit card data from the reader and sending the credit card data in a primary transaction message using the credit card authorization path to the at least one financial institution computer to undertake transaction processing;
   wherein the POS processor is programmed with instructions executable by the POS processor to:
   concurrently with sending the primary transaction message using the credit card authorization path, send the credit card data to the plural candidate financial institution computers to determine which financial institution issued a credit card associated with the credit card data, the credit card data being sent to the plural candidate financial institution computers in a secondary message using the secondary communication path different from the credit card authorization path;
   receive a response from a first one of the candidate financial institution computers;
   responsive to receiving the response, cause an opt-in offer to be presented to a consumer associated with the credit card to agree to share information;
   responsive to receiving a selection to opt-in to share information, send a message to the first one of the candidate financial institution computers indicating the opt-in;
   receive from the first one of the candidate financial institution computers consumer information for customers of a first financial institution associated with the first one of the candidate financial institution computers; and
   cause an opt-in notice and/or a privacy notice to be presented to the consumer at the POS based at least in part on the consumer information for customers of the first financial institution.

2. The system of claim 1, wherein the instructions are executable to present both the opt-in notice from the first one of the candidate financial institution computers and the privacy notice from the first one of the candidate financial institution computers at the POS.

3. The system of claim 1, wherein the instructions are executable to cause the opt-in notice to be presented to the consumer at the POS based at least in part on the consumer information for customers of the first financial institution.

4. The system of claim 1, wherein the instructions are executable to cause the privacy notice to be presented to the consumer at the POS based at least in part on the consumer information for customers of the first financial institution.

5. The system of claim 1, wherein the instructions are executable to, responsive to not receiving the response within a predetermined period, not cause the opt-in offer to be presented to the consumer.

6. The system of claim 1, wherein the opt-in offer is presented on a display.

7. The system of claim 1, wherein the opt-in offer comprises a prompt to make a verbal offer.

8. An assembly comprising:
   at least one financial system computer system comprising at least one processor;
   a credit card authorization path and/or mode;
   a secondary communication path and/or mode different from the credit card authorization path and/or mode; and
   instructions executable by the at least one processor to:
   receive credit card data input at a point of sale (POS) credit card reader from at least one POS computer in a primary transaction message received via the credit card authorization path and/or mode to undertake transaction processing;
   wherein the processor is programmed with instructions executable by the processor to:
   receive the credit card data from the secondary communication path and/or mode to determine which financial institution issued a credit card associated with the credit card data, the credit card data being sent to plural candidate financial institution computers in a secondary message using the secondary communication path and/or mode;
   send an opt-in offer to the POS computer to be presented to a consumer associated with the credit card to agree to share information;
   receive from the POS computer a selection to opt-in to share information;
   responsive to the selection to opt-in, send to the POS computer consumer information for customers of a first financial institution; and an opt-in notice and/or a privacy notice being presented to the consumer at the POS based at least in part on the consumer information for customers of the first financial institution, the assembly comprising the POS credit card reader, the POS computer, the credit card authorization path and/or mode, the secondary communication path and/or mode, and the plural candidate financial institution computers.

9. The assembly of claim 8, wherein the instructions are executable to send both the opt-in notice from a first one of the candidate financial institution computers and the privacy notice from the first one of the candidate financial institution computers at the POS.

10. The assembly of claim 8, wherein the instructions are executable to send the opt-in notice to the POS based at least in part on the consumer information for customers of the first financial institution.

11. The assembly of claim 8, wherein the instructions are executable to send the privacy notice to the POS based at least in part on the consumer information for customers of the first financial institution.

12. The assembly of claim 8, wherein the instructions are executable to, responsive to not receiving a response within a predetermined period, not send the opt-in offer to the POS.

13. A method, comprising:
receiving credit card data from a point of sale (POS) credit card reader;
sending the credit card data in a primary transaction message using a credit card authorization path to a financial institution computer system to undertake transaction processing;
in addition to sending the primary transaction message using the credit card authorization path, sending the credit card data to plural candidate financial institution computers to determine which financial institution issued a credit card associated with the credit card data, the credit card data being sent to the plural candidate financial institution computers in a secondary message using a secondary communication path different from the credit card authorization path;
receiving a response from a first one of the candidate financial institution computers;
responsive to receiving the response, causing an opt-in offer to be presented to a consumer associated with the credit card to agree to share information;
responsive to receiving a selection to opt-in to share information, sending a message to the first one of the candidate financial institution computers indicating the opt-in;
receiving from the first one of the candidate financial institution computers consumer information for customers of a first financial institution associated with the first one of the candidate financial institution computers; and
causing an opt-in notice and/or a privacy notice to be presented to the consumer at the POS based at least in part on the consumer information for customers of the first financial institution.

14. The method of claim 13, comprising presenting both the opt-in notice from the first one of the candidate financial institution computers and the privacy notice from the first one of the candidate financial institution computers at the POS.

15. The method of claim 13, comprising causing the opt-in notice to be presented to the consumer at the POS based at least in part on the consumer information for customers of the first financial institution.

16. The method of claim 13, comprising causing the privacy notice to be presented to the consumer at the POS based at least in part on the consumer information for customers of the first financial institution.

17. The method of claim 13, comprising, responsive to not receiving the response within a predetermined period, not causing the opt-in offer to be presented to the consumer.

18. The method of claim 13, wherein the opt-in offer is presented on a display.

19. The method of claim 13, wherein the opt-in offer comprises a prompt to make a verbal offer.

* * * * *